Kendrick & Whitcher.
Floating Dock.
No. 26,501. Patented Dec. 20, 1859.
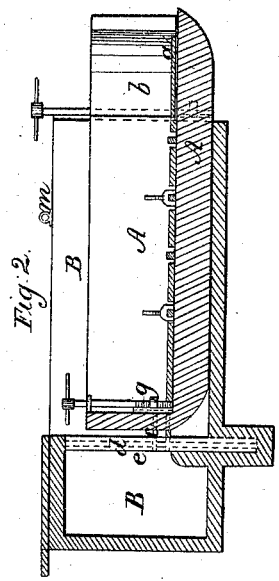
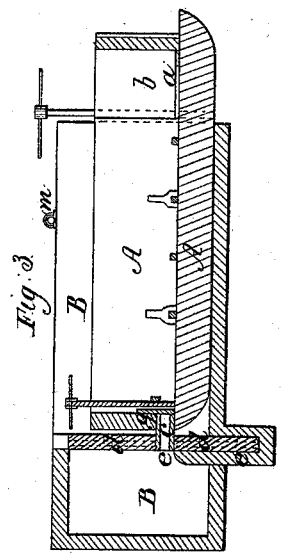
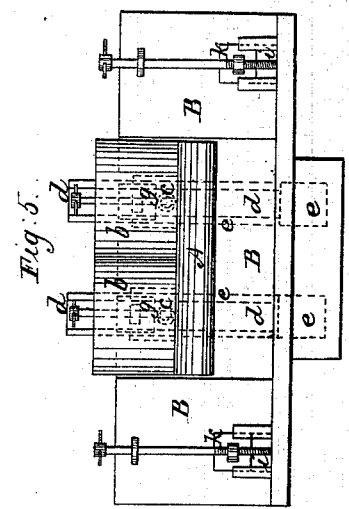
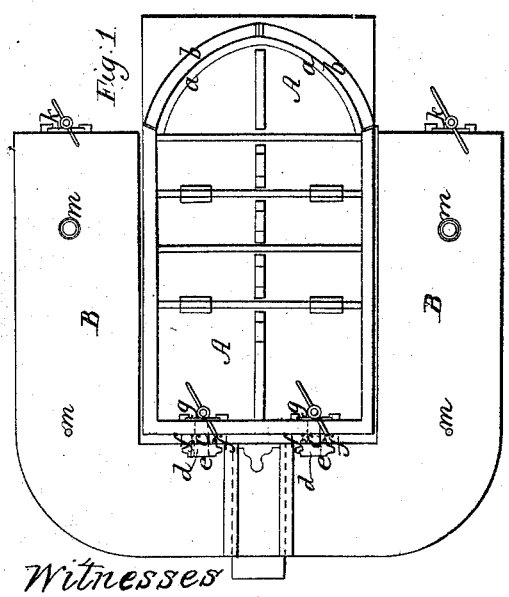
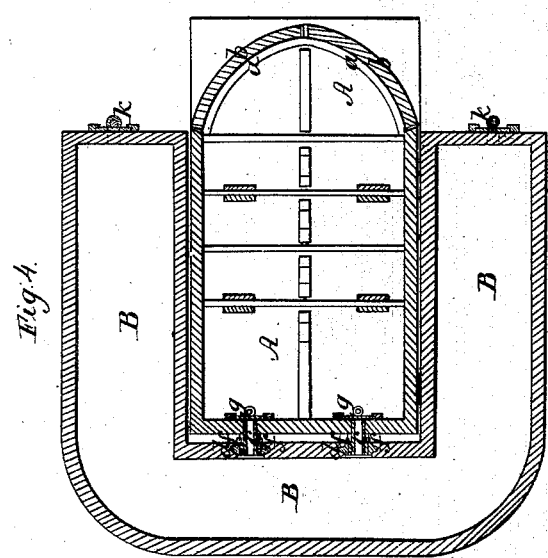
Witnesses
R. H. Eddy
S. P. Hall Jr.
Inventor:
W. A. Kendrick
G. H. Whitcher

UNITED STATES PATENT OFFICE.

WM. A. KENRICK AND GEO. H. WHITCHER, OF BOSTON, MASSACHUSETTS.

GRAVING-DOCK.

Specification of Letters Patent No. 26,501, dated December 20, 1859.

*To all whom it may concern:*

Be it known that we, WILLIAM A. KENRICK and GEORGE WHITCHER, of Boston, in the county of Suffolk and State of Massachusetts, have invented a new and useful Graving-Dock, and do hereby declare that the same is fully described and represented in the following specification and the accompanying drawings, of which—

Figure 1, denotes a top view of it, and Fig. 2, a central and longitudinal section thereof. Fig. 3, is another longitudinal section of it taken through one of the pipes or conduits of the floating dock and its stationary receiving basin or tank. Fig. 4, is a horizontal section, and Fig. 5, a front elevation of it.

In carrying out our invention, we employ a floating dock or vessel A, the outer end of which is open and furnished with a miter sill, $a$, and entrance gates, $b, b$.

The floating vessel or dock, we place within a slip or opening formed by a receiving basin or tank B, surrounding the dock on its two sides and head, the top surface or covering of the tank constituting a wharf for landing materials or for such other purposes as may be desirable. The larger the horizontal sectional area of the tank, with respect to that of the dock the better it will be for discharge of water from the dock.

The interiors of the dock and tank may be connected by one or more flexible tubes furnished with gates the tubes being so applied as to allow the dock to rise and fall in its slip or opening. The mode we prefer for making such connection is shown in the drawings, wherein $c$, is a tube attached to and opening through the head of the dock and also attached to and made to open through a long vertical gate or slide, $d$, extending a considerable distance below and covering a long opening, $e$, made vertically in the inner wall of the head of the tank as shown in Figs. 3, and 4. Each gate, $b$, may be connected to the dock head by metallic staples, $f$. It should be observed that the extension of the slide, $d$, below as well as above the opening, $e$, should be such, that such opening shall always be covered by the slide whatever may be the elevation of the dock, the slide or gate being movable with and moved by the dock. Furthermore, to each of the conduits or tubes, $c$, a gate or valve, $g$, is applied so as to enable the passage through the tube to be either interrupted or opened at pleasure.

The receiving basin should be constructed with one or more discharging openings, $i$, each of which should have a closing gate, $k$, the same being arranged on the outer ends of the basin as shown in the drawings.

In order that the basin or tank pier, as it may be termed, may operate with the elevating dock in the manner to be hereinafter described, it should be erected in tide water and where the water is of sufficient depth, to enable the largest vessel the dock may be calculated to receive, to be floated into it at high water and while the dock may be resting on the bottom of the slip.

Through the deck of the receiving tank, B, one or more air holes, $m$ should be made.

In the process of preparing the dock for the reception of a ship or navigable vessel, we close the gates of the dock and tank connecting pipes and open the discharging gates of the tank, it being understood that this should be done prior to the falling of the tide or while it may be falling. At low tide, the great gates of the front end of the dock should be opened, and the outer valves or gates of the tank should be closed—after which as the tide rises, it will flow freely into the dock, but will not into the tank, the dock remaining in the meantime on the bottom of its slip or pier opening. At high water, the ship should be floated into the dock and the great gates, $b, b$, should be closed immediately afterward. This having been done, the gates of the connecting pipes of the tank and dock should be opened or raised so as to allow the water within the dock to be discharged into the tank, into which it will flow until the level of the water in the two is the same. In the meantime, the pressure of the water outside of the tank and dock, will cause the latter to float and rise upward, and thereby facilitate the discharge of water from the dock into the tank. It is easy to see, that if the horizontal sectional area of the interior of the tank be large enough to allow the upper surface of the bottom of the dock to rise to a little above the level of the top surface of the water that may have been so discharged into the tank, the interior of the dock will have been freed from water. Having discharged the water from the dock, we should close the gates of the communication pipes, and open the discharging gates of the tank.

During fall of the tide, the water in the tank will flow out of it, and when the tide has fallen to its lowest extent, the said discharging gates should be closed.

In the above manner, and without the necessity of employing pumps or engines to free the dock from water, we can dock a ship and relieve the dock from water, preparatory to graving, coppering or examining the vessel's hull or making any repairs thereon. The process of taking her out of dock at high water, is simply to open all the gates of discharge and connection passages or openings so as to allow water to flow from the tank into the dock. This will not only cause the ship to float in the dock, but the dock to sink to the bottom of the slip. As soon as the water in the dock may have attained the level of the tide water outside of it, the great gates of the dock may be opened and the ship be floated out of the dock.

We claim as our invention—

1. The floating dock, A, and the stationary receiving basin or tank, B, in combination and as furnished not only with one or more connection pipes and gates for discharge of water from the dock into the tank or vice versa, but with one or more passages and gates arranged in the tank so as to either discharge water therefrom into the sea or admit it to pass from the sea into the tank, all substantially in manner and for the purpose as specified.

2. And we also claim the elevating slide, d, in combination with a connection pipe of the dock and a deep opening, e, made in the tank, the said slide being arranged therewith and connected with the dock substantially as specified.

W. A. KENRICK.
G. H. WHITCHER.

Witnesses:
R. H. EDDY,
F. P. HALE, Jr.